US007454377B1

(12) United States Patent
Beaumont

(10) Patent No.: US 7,454,377 B1
(45) Date of Patent: Nov. 18, 2008

(54) COMPUTER METHOD AND APPARATUS FOR AGGREGATING AND SEGMENTING PROBABILISTIC DISTRIBUTIONS

(75) Inventor: Perry Harley Beaumont, East Hampton, NY (US)

(73) Assignee: Perry H. Beaumont, Ridgefield, CT (US)

( * ) Notice: Subject to any disclaimer, the term of this patent is extended or adjusted under 35 U.S.C. 154(b) by 1018 days.

(21) Appl. No.: 10/672,466

(22) Filed: Sep. 26, 2003

(51) Int. Cl.
*G06Q 40/00* (2006.01)
*G06F 17/10* (2006.01)
(52) U.S. Cl. .......................... 705/36 T; 705/36; 703/2
(58) Field of Classification Search .................. 705/36, 705/36 T; 703/2
See application file for complete search history.

(56) References Cited

U.S. PATENT DOCUMENTS

| 5,812,988 | A | * | 9/1998 | Sandretto | 705/36 R |
|---|---|---|---|---|---|
| 5,884,287 | A | * | 3/1999 | Edesess | 705/36 R |
| 5,999,918 | A | * | 12/1999 | Williams et al. | 705/36 R |
| 6,078,904 | A | * | 6/2000 | Rebane | 705/36 R |
| 7,024,388 | B2 | * | 4/2006 | Stefek et al. | 705/38 |
| 7,337,137 | B2 | * | 2/2008 | Zosin et al. | 705/36 R |
| 7,415,433 | B2 | * | 8/2008 | Huneault | 705/36 R |
| 2002/0123953 | A1 | * | 9/2002 | Goldfarb et al. | 705/36 |
| 2002/0169702 | A1 | * | 11/2002 | Eaton et al. | 705/36 |
| 2003/0055765 | A1 | * | 3/2003 | Bernhardt | 705/36 |
| 2003/0088365 | A1 | * | 5/2003 | Becker | 702/19 |
| 2003/0120577 | A1 | * | 6/2003 | Sakui et al. | 705/36 |
| 2004/0111350 | A1 | * | 6/2004 | Charnley, Jr. | 705/36 |

OTHER PUBLICATIONS

"Economic Properties of the Risk Sensitive Criteria for Portfolio Management", Tomasz R Bielecki, Review of Accounting and Finance, vol. 2, 2003.*
"Interpretations of the CAPM, diversification, and beta: clarifications.", Academy of Accounting and Financial Studies Journal, v4, n2, p. 82, May 2000.*

* cited by examiner

*Primary Examiner*—Thomas A Dixon
*Assistant Examiner*—Mohammad Z Shaikh

(57) ABSTRACT

Computer method and apparatus that permits a sensory oriented interactive real time aggregation and segmentation of probabilistic distributions derived from quantitative and qualitative data of one or more sources with a feedback mechanism that describes distribution attributes in a variety of visual, kinetic, and aural contexts.

10 Claims, 12 Drawing Sheets

Fig. 1

```
Please select desired product types:

o  Money market instruments
04 ─┐   o  Bonds
    ├──── o  Stocks
02 ─┘   o  Other
                                    Next >
```

Fig. 2

Please select desired types of stocks:

06 — o U.S. stocks
    o International stocks (excluding the U.S.)
    o Global stocks (the U.S. and outside of the U.S.)

More information      < Back   Next >

Fig. 3

Please select the market index(es) that you believe most accurately reflects your market risk and return objectives for the following portion of your portfolio: [ U.S. stocks ]

| Index | Returns for the past... 1 year  5 years 10 years | Volatility for the past... 1 year  5 years 10 years |

- o  S&P 100
- o  S&P 500
- o  Nasdaq 100
- o  Other

[ < Back ]  [ Next > ]

[ STOP ]

Optional: Please select the index(es) or credit quality range that you believe reflects your credit objectives for the following portion of your portfolio: [ U.S. stocks ]

By index ...

Average credit rating

| Index | Capitalization-weighted | Previous ratings 1-year | 3-year | 5-year |

- S&P 100
- S&P 500
- Nasdaq 100
- Other (Simply click on the above index of interest for additional credit information about the index's characteristics inclusive of the types of products contained in the index)

By credit quality ...

- Range between a low of [ ] and a high of [ ]

- An average of [ ] but no lower than [ ] or higher than [ ]

[ SKIP TO STRUCTURE RISK ]   [ < Back ] [ Next > ]

[ STOP ]

Fig. 5

Optional: Please select the structure types that you believe most accurately reflect your personal structure risk objectives for the following portion of your portfolio: [U.S. stocks]

Structure type (please click all that apply):

o The products contained in the index selected in Step three only*, or o The products contained in the index selected in Step three and the following (please select all that apply):

o Common stock
    o First preferred
    o Second preferred
    o Other

Simply click on any of the terms at left for a brief description.

\* Click here to see a summary of products contained within the index(es) you selected

[DERIVATIVES?]     [< Back] [Next >]

Fig. 6

Please find below a color-coded pictorial of your Risk Return Profile relative to a comparative portfolio. The length of each colored bar provides a measure of the relative proportion of each exposure type within the comparative portfolio.

Market 

Structure 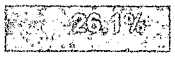

Credit 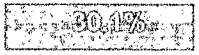

Your aggregate comparative portfolio profile is here

Key:

☐ Exposure is within a reasonable range of your expressed preferences

▨ Exposure is outside range of your expressed preferences

☒ Exposure is well outside of the range of your expressed preferences

Simply click on the exposure bar of interest for more details on the discrepancies within your portfolio versus your expressed preferences.

Click here to invoke a comparison of your target portfolio with a "prudent investor" or other comparative portfolio — 36

Are there any other additional users to provide a Risk Return Profile?

Yes (34)    No (38)

Fig. 7

You have indicated that more than one investor is to be included in this process of creating a Risk Return Profile.

In order to accurately combine the input of all investors into a single aggregated Risk Return Profile, please answer the following questions:

How many investors are to be aggregated into the single profile? | 3 |

Is each individual investor's profile to be weighted with equal importance when the aggregate profile is created? ○ Yes ● No Since not all profiles are to be weighted equally, please provide
   weightings to be used (in percent):

Investor 1: | 50 |   Investor 2: | 25 |   Investor 3: | 25 |

< Back   Next >

40

COMPUTER METHOD AND APPARATUS FOR AGGREGATING AND SEGMENTING PROBABILISTIC DISTRIBUTIONS

BACKGROUND OF THE INVENTION

1. Field of the Invention

This invention relates generally to the field of computer user interfaces, and more particularly to computer applications such as financial investments involving probabilistic distributions and the segmentation and aggregation thereof.

2. Background

Commonly used methods of constructing investment portfolios rely upon principles of the Capital Asset Pricing Model (CAPM). In 1990 the Nobel Prize in Economics was awarded to William Sharpe in recognition of his CAPM-related contributions. However, as with any theoretical construct, embedded within the CAPM are assumptions that serve to simplify the process of arriving at optimally structured portfolios. These simplifying assumptions have increasingly served to undermine the value of the CAPM over the more than four decades since the first ideas pertaining to the CAPM were introduced, and for a number of reasons including the rapid and ongoing evolution of capital markets generally and of statistical methods in particular. The theory's centerpiece of normally distributed returns has been increasingly brought into question, particularly with the proliferation of financial products and strategies specifically designed for generating non-Gaussian risk and return distributions. Concomitantly, thinly sliced segmentations of financial risk and return are now achievable, as is the computational ability to aggregate disparate statistical profiles. The speed and agility of personal computers today have also advanced well beyond the technical capabilities of even the most advanced computer systems of just a few years ago.

As to other limitations of the CAPM, from a more macro consideration the CAPM is designed to evaluate one investor profile at a time, thus rendering it of little value for situations where family, business, governmental, and/or other entities have collective interests with jointly defining an investment orientation. From a more micro perspective CAPM-generated probabilistic distributions do not make internal differentiations among potential segmentations of risk and return combinations. CAPM-distributions are formally characterized as an embodiment of "market risk and return", yet this characterization can be misleading at best and detrimental to efficacious portfolio construction at worst. Perhaps a more meaningful description of CAPM distributions would be that they represent an embodiment of "financial risk and return", where financial risk and return can embody market risk and return, credit risk and return, and structure risk and return. While there may be alternative terms to describe these risk and return prototypes, or even additional risk and return classifications that could be proposed, the essential point remains that risk and return can be segmented well beyond the simplistic all-encompassing "market risk and return" caricature of the CAPM.

As a commonplace practice today, investment counselors ask investors to describe their individual risk and return preferences in relation to rather broad product labels inclusive of "equities" or "bonds". While these product classifications may have served a useful purpose at one point in time, today these labels can be misleading. With the advent and widespread acceptance of risky bond products (as with junk bonds, mezzanine debt, and perpetuals), it is an easy matter to identify bonds that are riskier than many equities, and to name equities that are less risky than even some U.S. Treasuries. At the same time, there has been tremendous growth in so-called absolute return and alternative investment funds, and these are often characterized by an objective of generating highly skewed non-normal returns. In sum, more relevant and meaningful risk and return designations are required for today's financial environment, and risk and return designations that can more readily and completely allow for a segmentation and aggregation of financial risks and returns. The present invention succeeds in these regards as follows:

1. The invention allows for a real time segmentation and aggregation of various financial risk and return probabilistic distributions. Further, these distributions may be segmented or aggregated for one or more investors within the context of a single aggregated risk and return profile.
2. Statistical profiles are not assumed or constrained to be Gaussian.
3. The catch-all role of "market risk and return" under a CAPM approach is instead differentiable into market risk and return, structure risk and return, and credit risk and return, and such that these and/or any other risk and return combinations may be isolated or not as per user preferences.
4. The invention may be applied as an input module to a process of creating optimal portfolios or for evaluating new or substitute features of an existing portfolio, and as an output module for a process that describes risk and return within already-existing portfolios.

The present invention also has implications for quantitatively oriented combinatory processes related to risk and return assessments involving one or more products within or across asset classes. For example, the present invention may be of value with providing a meaningful summary of multiple equity analyst forecasts of a given stock so as to generate a single aggregated forecast that is meaningfully communicated to investors.

As to contemporary investment models, these are typically structured around considerations pertaining to an investor's age, financial goals, marital and family status, and so forth, and they generally rely upon some variation of a CAPM-type portfolio optimization tool. The present invention embraces an entirely different approach with the application of innovative techniques involving risk and return attributes of probability distributions linked to financial products. Within this context, an investor's risk and return preferences may be expressed in a greater variety of ways that go well beyond the CAPM's two-dimensional confines of mean and variance and related financial variables of sigma and beta.

The ability to effectuate the novelty of the invention's design, and the desirability of the invention's output, are appreciably enhanced by five factors:

First, recent advances with statistical and econometrical methodologies, particularly in the area of combinatory processes related to probabilistic distributions;

Second, the timely realization of investors that financial risks extend well beyond mere market risk to include credit risk as well as structure risk;

Third, the ability today to capture a variety of financial data that may be meaningfully collated for risk evaluation purposes;

Fourth, advances in the power and functionality of personal computers, and;

Fifth, the growth in the variety and availability of a diverse amount of traditional and non-traditional financial products inclusive of so-called hybrids and alternative investments.

The present invention is differentiated from existing financial investment tools in several ways. First, the invention permits a risk and return perspective that can extend well beyond a two-dimensional mean/variance profile of financial risk and return (where mean and variance are the first two moments of a probability distribution) to embrace a greater magnitude of substance and nuance via considerations of higher moments including, though not limited to, kurtosis and leptokurtosis. The more non-normal a distribution, the more valuable these higher moments become. Separately, a number of academic studies are now available that describe historically-used risk variables inclusive of beta and sigma as necessary though insufficient descriptors of actual risks borne by investors. Some of these studies go so far as to suggest that these traditional variables have become obsolete.

Second, unlike most contemporary models, the invention does not require an investor's personal financial data (income, age, savings, and so forth) to create a target portfolio, but rather translates an investor's expressed risk and return preferences into a target portfolio. Nonetheless, if an investor were to desire a forward-looking extrapolation of a portfolio generated by the present invention, and if he wanted to evaluate such an extrapolation on the basis of his personal financial data, this could easily be accomplished with the present invention. The invention may also be used to evaluate an already-existing portfolio relative to an investor's expressed risk and return appetite.

Third, the invention does not presumptuously impose its own pre-determined sense of appropriate investments on the basis of an investor's personal data, but rather focuses upon the investor's expressed risk and return preferences. While the present invention could most certainly be used in conjunction with existing so-called lifecycle investment models or CAPM-like optimization tools, a value of the present invention lies in its original orientation towards creating a successful marriage between an investor's risk and return objectives and the financial instruments that best satisfy those objectives.

Fourth, the invention does not rely upon traditional and increasingly outmoded financial labels to define risk and return profiles. As the markets have today reached a critical juncture whereby high yield (junk bond) securities may reflect greater price volatility relative to many equities, and some equities may have a lower price volatility relative to certain investment-grade debt, older label-oriented models are simply incapable of providing the same quality of output as the present invention.

The present invention may also be used in the context of aggregating expert opinions of an anticipated financial event or outcome. For example, in the context of the equity markets, it is often the case that a number of stock analysts will provide varied outlooks for the future price performance of a given company. The present invention readily provides a context for how those forecasts may be aggregated in a meaningful way, and with important non-obvious consequences for investment opportunities.

The present invention identifies three first-tier categories of financial risk and return, though an unlimited number of risk and return classifications are easily accommodated. The three first-tier categories of risk and return-types considered and defined herein include market risk and return, credit risk and return, and structure risk and return. A common thread across market, credit, and structure profiles is that each of these may be expressed in price terms, may be described with multiple moments, and may be aggregated into a single overall risk and return profile.

For present purposes, structure risk and return is defined as that portion of an asset's price behavior attributable to an asset's engineering. For example, and as is well known to those skilled in the art, a callable bond is engineered differently from a putable bond, and as such, ceteras paribas, these two instruments would not be expected to behave in symmetrical fashion in response to market or credit stimuli. This unique price behavior can be captured and cataloged accordingly under the heading of structure risk and return.

Credit risk and return is defined here as that portion of an asset's price behavior attributable to an asset's position within a particular issuer's capital structure. For example, the same company can be an issuer of both senior and subordinated debt, and at the same point in time. The senior debt would likely carry a credit rating superior to the subordinated debt, and perhaps for the simple reason that the senior debt affords an investor a more privileged recovery status in the event of the company's default. As a direct result of these asymmetrical credit protections, these instruments would not be expected to behave in a symmetrical fashion in response to a credit risk stimulus.

To quantify the market risk and return portion of an asset's price behavior, one approach might be to say that it simply comprises whatever portion of total financial risk and return that remains unexplained after quantifying the risk and return contributions of structure and credit. But if an asset's contribution to market risk and return were to be calculated and not inferred (perhaps leaving the contributions of credit or structure to be inferred), this could be accomplished with reference to an actual or synthetically pure market risk and return instrument. For example, the U.S. Treasury yield curve is commonly used as an embodiment of pure market risk and return for the bond market, thus providing a baseline for segmenting a non-Treasury instrument's market risk and return from its credit and structure components.

For purposes of the present invention, the manner of how market, credit, and structure can be categorized by risk and return profile is not as consequential as the fact that they can be meaningfully segmented. Further, the possibility that others may consider market, credit, or structure as non-first tier categories, or might seek a greater granularity of precision within any of these categories as with segmenting market risk and return into elements of liquidity, twist, roll-down, or any other terms of art, is also a tertiary matter relative to the fact that any of these measures are easily accommodated by the present invention.

Financial products can embody a variety of different investment vehicles. Although equities, bonds, and currencies may more commonly be regarded as financial products, other financial products might be said to include certain types of real estate transactions, commodities, antique collections, and so forth. The present invention does not exclude any type of investment vehicle, and the specific examples presented herein are not intended to be exhaustive in terms of either scope or applicability of the present invention.

As is well known by those skilled in the art, rating agencies exist whose primary function is to provide investors with guidance on the creditworthiness of companies, and generally in the form of a letter and/or number grade. Credit ratings exist for governments, businesses, and currencies, as well as for specific products. For example, a company may have one credit rating for its long-term bonds that differs from the credit rating on its short-term bonds. The rationale for this may be that near-term business prospects appear to be more favorable than longer-term prospects. While many investors believe credit risk to be of primary concern for bond investments, recent events involving such large corporations as Enron, Arthur Anderson, and others highlight how credit events can have a devastating impact on shareholders as well.

Many academic studies are also now beginning to appear that demonstrate the presence of credit risk premia in equities.

At the same time that lines are being blurred across asset classes as with junk bonds and equities, distinctions among products within asset classes are growing more complex. In the context of equities, there is common stock and preferred stock. Although holders of preferred stock generally do not have identical voting rights of common stock investors, preferred stock typically pays a fixed dividend whereas common stock may pay a fluctuating dividend or no dividend at all. Preferred shareholders have a more senior status to common stock holders in the event of liquidation, and for this reason common equity is sometimes called junior equity. Different types of preferred shares include, though are not limited to, cumulative, non-cumulative, participating, and convertible. Preferred stock may also come with warrants attached, or may be callable. Preferred shares may be ranked in seniority (as in first versus second preferred shares) or have dividend payments guaranteed by a third party, though these considerations are perhaps more properly designated as credit-related phenomena rather than strictly structure-related. While a single company usually issues one type of common stock, it may have several different types of preferred stock outstanding at any point in time.

In the context of bonds, debt may be structured as a debenture or pass-through, with a coupon or without, as a callable or putable, extendible or retractable, convertible or exchangeable, secured or unsecured, and with or without a considerable number of other features. A single company may have many different types of debt outstanding at any one point in time.

The preceding descriptors of equities and bonds are not intended to be exhaustive, nor are the product-types cited here to be definitively construed as being within the exclusive domain of "equities" or "bonds". For example, many financial professionals regard preferred shares as being more bond-like than equity-like owing to their fixed dividends (akin to coupons) and stated maturity dates. Other financial professionals are of an opposite view stemming from the junior credit standing of preferreds. Even within the context of commonly used market indexes, differences of product inclusion arise. For example, while the S&P 500 index is comprised exclusively of common stock, the Wilshire 5000 index is comprised of common stock, preferred shares, real estate investment trusts (REITs), and limited partnerships. In sum, as financial products increasingly defy simple categorization by traditional methods, a non-traditional approach is required, and the present invention offers a unique software-based solution.

SUMMARY OF THE INVENTION

A computer interface system that includes interactive interface controls as well as aural and kinetic interface controls to assist in educating a user, in profiling a user, and in controlling and monitoring the implementation of actions based on probabilistic distributions. The system allows the user to indicate, either directly or indirectly, the attributes he or she desires for actions involving probabilistic distributions such as investments. In a preferred embodiment, a profiler also allows the user to specify other characteristics and constraints related to manipulation of one or more probabilistic distributions in the context of a master sensory palate. The user is able to manipulate the interface controls to evaluate results in terms of risk and reward. If the user approves the results and his or her profile, in a preferred embodiment the selections are transmitted to effectuate an action.

It is an aspect of the present invention that it provides the ability to segment and aggregate combinations of financial risk and reward applicable to probabilistic distributions.

It is yet another aspect of the present invention that it helps to educate a user about the consequences of actions related to probabilistic distributions.

Other objects and advantages of the present invention include without limitation (a) an explicit treatment of tax and regulatory considerations in the investment evaluation making process; (b) an explicit treatment of derivative products and strategies in the investment evaluation process; and (c) a robust schema for the understanding of probabilistic distributions as they relate to the importance of an investment decision making process.

BRIEF DESCRIPTION OF THE DRAWINGS

FIG. 1 is an illustrative profiling screen according to the method and apparatus of the present invention.

FIG. 2 shows an illustrative profiling screen according to the method and apparatus of the present invention.

FIG. 3 is another illustrative profiling screen according to the method and apparatus of the present invention.

FIG. 4 shows another illustrative profiling screen according to the method and apparatus of the present invention.

FIG. 5 is still another illustrative profiling screen according to the method and apparatus of the present invention.

FIG. 6 is a color schematic depiction of a user profile and discrepancy indicator according to the method and apparatus of the present invention.

FIG. 7 is an illustrative profiling screen according to the method and apparatus of the present invention.

DETAILED DESCRIPTION OF THE INVENTION

Figure 8:
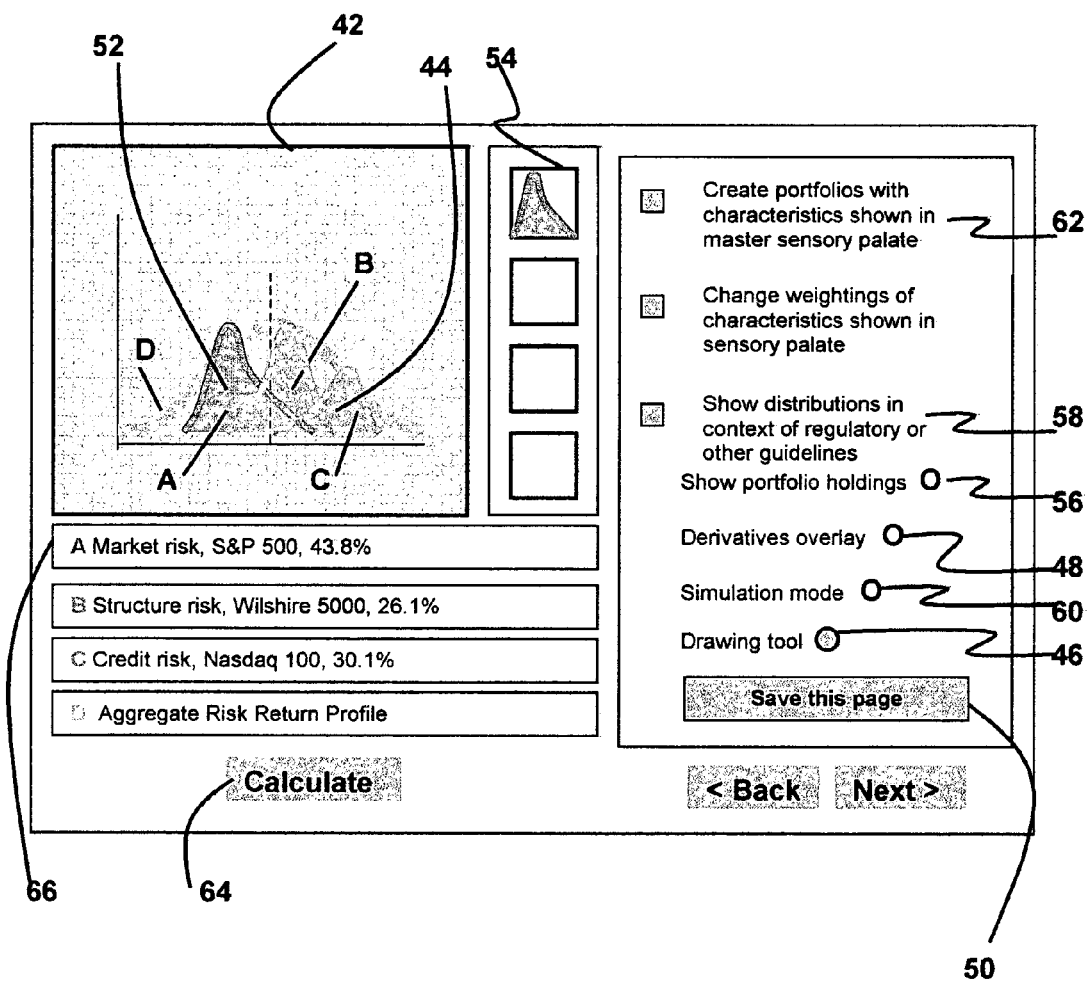
FIG. 8 is a color schematic depiction of a user profile and discrepancy indicator in the context of the sensory palate according to the method and apparatus of the present invention.

In FIG. 1 the first input panel of the interactive display of the virtual investment counselor of a preferred embodiment is shown. FIG. 1 is where the process of creating a Risk Return Profile begins. As can be seen, this panel allows the user to indicate the types of financial products that he wants to have in a target portfolio. If the choice of other 02 is selected in FIG. 1, a new panel appears that allows the user to identify an unlimited number of product categories. This new panel also provides the user with a button to return back to the input mode in FIG. 1.

In FIG. 2 the user is prompted for further information about the preferences indicated in FIG. 1. For example, if stocks 04 were selected in FIG. 1, then FIG. 2 will prompt the user to identify the desired categories of stocks for the target portfolio. If the user desires statistical data about certain categories of stock this may also be requested at this panel. The panel providing this additional information also provides the user with a button to return back to the input mode in FIG. 2.

In FIG. 3 the user is prompted to provide further information about the preferences indicated in FIG. 2. For example, if U.S. stocks 06 were selected in FIG. 2, then FIG. 3 will prompt the user to identify the stock index(es) they wish to include in the target portfolio. Historical data pertaining to these indices is also provided to guide the user at this juncture. If the choice of other 08 is selected in FIG. 3, a new panel appears that allows the user to identify an unlimited number of additional well-known or proprietary indexes. If a proprietary index is desired where certain required descriptive data is not known, the user is prompted for this data for later use when various algorithms may be invoked. A proprietary index can be defined in the present context as a particular set of securities or financial products of interest to the user. If more than one index is selected, the user will be further prompted to designate weightings to be applied to each index so as to arrive at a total allocation of one hundred percent. If any panels are invoked beyond FIG. 3, a button is made available to return the user back to FIG. 3.

If a user wishes to use a composite of several indexes (on an intra- or inter-national basis), a sub-set of a single index, or a single index with certain non-index securities added in, these are all readily accommodated. A sub-set of an equity index could be created by capturing only transportation issues, or limiting equities to those with a beta in excess of a particular specified value, or by any other delimiting criteria of interest.

With the data provided in FIGS. 1-3, the user has satisfied the necessary input requirements for defining a preferred market risk and return profile for the target portfolio (Risk Return Profile). At this point the user may choose to cease the data input process at 10 in FIG. 3. Alternatively, the user may choose to continue to provide data that defines a desired allocation of credit in the target portfolio, and/or a preferred allocation of structure. Collectively, market, credit, and structure risk and return embody an aggregate of overall financial risk and return. If a user desires to further segment any of these three categories of financial risk and return, this is easily accommodated. When the next button 12 is selected as shown in FIG. 3, the user is taken to FIG. 4.

In the simplest of cases, the user selects only one index to be his target for market, credit, and structure risk and return. In the event that one index is desired to target market risk and return (for example, Index A) and a separate index is desired to target credit and structure risk and return (for example, Index B), then additional calculations are required. That is, that portion of Index A relating to market risk and return needs to be isolated, as does the portion of Index B relating to credit and structure risk and return. Next, the market risk and return profile from Index A needs to be merged in proper proportion with the credit and structure risk and return profiles from Index B. In other words, weights need to be assigned to the importance that each risk and return segment will have in the aggregated Risk Return Profile. To accomplish this, the user will be automatically queried for a weighting methodology whenever a mix of market, credit, or structure benchmarks is invoked. A user may provide his own preferred weights under the constraint that they sum to one-hundred percent, or the user may select a reference index that embodies the desired mix of exposures to market, credit, and structure.

In the event that a user decides not to provide any additional input beyond the market risk and return stage at FIG. 3, this does not imply that the target portfolio will necessarily be devoid of credit or structure considerations; it simply means that the user has, by default, acknowledged that any credit and structure exposures in the target portfolio will be the same as that embodied in the index selected for market exposure. At least among cash instruments, it is possible for a financial asset to have market risk with no structure or credit risk (as with a generic U.S. Treasury bill), but it is not generally possible for a cash asset to have structure or credit risk without market risk. It is possible for a cash asset to have structure risk without credit risk, and to have credit risk without structure risk. However, in the derivatives market, and as a recent phenomenon, it is now possible to isolate these risk and return categories. That is, it is possible to obtain a credit derivative that is devoid of market and structure risk and return exigencies, and to create pure market or structure risk and return profiles. What makes this a particularly powerful phenomenon today is that these derivatives can thus be used to both create and hedge any of these classifications of financial exposure. As rudimentary examples, consider a callable bond that can be created with a bullet bond and a short position in a call option, versus a bullet bond that can be created with a callable bond and a long position in a call option.

As shown in FIG. 4, the user is explicitly asked if he would like to stop the input process altogether 14, skip the credit input process at 16 to proceed directly to structure input in FIG. 5, or proceed with providing credit input. The user has the ability to review historical credit data of indexes 18, to request additional information about the credit features of indexes 20, and to express a desired credit allocation independent of any indexes 22. The option to create a credit profile is provided for each index selected by the user in FIG. 3. If the user chooses to stop the input process at 14 in FIG. 4 he is directed to FIG. 7. If the user instead chooses to provide credit input he is directed to FIG. 5 after all necessary input is provided and the next button 24 is selected. If the choice of other 26 is selected in FIG. 4, a new panel appears that allows the user to identify an unlimited number of additional well-known or proprietary indexes. If a proprietary index is selected, the user is prompted for descriptive statistical data pertaining to the index for later use when various algorithms may be invoked. If more than one index is selected, the user will be further prompted to designate the weightings to be applied to each index so as to arrive at a total value of one hundred percent. If any panels are invoked beyond FIG. 4, a button is made available to return the user back to FIG. 4.

In FIG. 5 the user is prompted to provide information about their desired structure allocation. The option to create a structure profile is provided for each index selected by the user in FIG. 3. The user also has the ability to request additional information about the products presented in FIG. 5. If the user chooses to add products beyond those listed in FIG. 5, this is signaled with other 28 and a new panel will appear. If a structure is selected that is not part of the index selected in FIG. 3, then the user will be further prompted to designate the weightings to be applied to each structure so as to arrive at a total value of one hundred percent. If the user wants to bring derivative structures into consideration, this is achieved in FIG. 5 by selecting derivatives 30. Selecting derivatives at 30 invokes a new panel where the user may choose among a variety of listed and over-the-counter derivative products as well as derivative strategies. Any selected products or strategies are automatically exported to the user's target portfolio profile, and a button is made available to return the user back to FIG. 5.

When the next key 32 is selected in FIG. 5, the user is brought to FIG. 6 where a summary of all relevant previous figures is provided and where individual Risk Return Profile components have been integrated into a single Risk Return Profile via the Risk Return Profile Integration Function. As also shown in FIG. 6, the user is asked if any other additional investors are to provide Risk Return Profile information. If the answer is yes at 34 in FIG. 6 then the user is taken to FIG. 7 where he is asked to specify the total number of investors who will be generating separate Risk Return Profiles to be combined into a single aggregate Risk Return Profile. In FIG. 7 the user is asked to designate weightings to be applied to each investor so as to arrive at a total value of one hundred percent. When the next key 40 is selected in FIG. 7 the user is taken to FIG. 1 where a new additional Risk Return Profile may be created. The Risk Return Profile creation process inclusive of FIGS. 1 through 6 is then repeated for each of the total number of Risk Return Profiles to be considered.

If there is no existing actual portfolio to be compared against in FIG. 6, then the target Risk Return Profile may simply be viewed in isolation as one embodiment of the user's stated investment preferences, and as such can be a useful guide for constructing a comparative portfolio. To put this differently, in the absence of a comparative portfolio, FIG. 6 can be seen as providing the embodiment of a preferred portfolio (Risk Return. Profile), while in the presence of a comparative portfolio FIG. 6 can be seen as a risk management tool that highlights discrepancies between stated preferences and actual holdings. When multiple investors are involved, each individual Risk Return Profile is aggregated into a single aggregated Risk Return Profile via the Investor Aggregation Function, and the single aggregated Risk Return Profile is shown alongside each individual user's Risk. Return Profile. When multiple Risk Return Profiles are combined, each respective marginal probability distribution is preserved.

In the absence of a comparative portfolio, as an alternative to presenting the target portfolio in isolation in FIG. 6 it may be desirable to evaluate the target portfolio (Risk Return Profile) alongside a previously created "prudent investor" profile. A library of such generic portfolios could easily be created for a variety of investor profiles, and a listing of these is readily available via 36 in FIG. 6. Discrepancies, if any, between a Risk Return Profile and an actual, "prudent investor", or any other comparative portfolio of interest are highlighted by different colored bars as shown and described within FIG. 6. In place of a color-coded scheme, product bars can be defined by distinctive black-and-white markings.

In the context of a single investor Risk Return Profile, a color-coding of comparative risks and returns (between the Risk Return Profile and an actual or hypothetical portfolio) can be performed in relation to marginal probability distributions of the Risk Return Profile or in relation to the aggregate Risk Return Profile. In the event that the Risk Return Profile is comprised one-hundred percent of market exposure, an analysis of a Risk Return Profile's marginal probability distributions would be tantamount to an analysis of the aggregated Risk Return Profile.

In the context of a multiple investor Risk Return Profile, a color-coding of comparative risks and returns can be performed in relation to marginal probability distributions of individual investor profiles, or in relation to an aggregated set of individual marginal probability distributions. A color-coding of comparative risks and rewards in the context of multiple investors could also be performed in relation to individual investor Risk Return Profiles, or in relation to an aggregated set of individual Risk Return Profiles.

Discrepancies between a Risk Return Profile and a comparative portfolio are defined in terms of the mean and standard deviation of the relevant aspects of the Risk Return Profile (as with the marginal probability distributions of the Risk Return Profile versus the aggregate Risk Return Profile) relative to the mean of the relevant aspects of the comparative portfolio. The formula for discrepancy is as follows:

$$\text{Discrepancy} = |E[X_{Target}] - E[X_{Comparative}]| / (Var[X_{Target}])^{0.5}, \quad \text{EQU1}$$

where respective values are weighted appropriately and such that total weight is one hundred percent.

Color displays are assigned according to the result of EQU1 whereby a value less than or equal to 1.00 is coded green, a value greater than 1.00 but less than or equal to 2.01 is coded yellow, and a value greater than 2.01 is coded red.

With the above-described methodology for color generation, it is possible for a category of financial risk and return to be coded as red if it has, for example, a market profile that is below the desired target level specified by the user. This stems from using the absolute value of the difference between target and actual mean values. The bias of conventional risk evaluation methods is to single out investments that embody more risk than the user's desired target level. Accordingly, the present invention regards any significant deviation from target as a noteworthy event, whether that deviation is in terms of a greater risk relative to target or in terms of a lesser risk relative to target.

When the no button 38, is ultimately selected in FIG. 6, the user is taken to FIG. 8 where a Risk Return Profile of one or more users is shown along with relevant segmentations of the Risk Return Profile. The colors or markings associated with the portfolio from FIG. 6 are carried over into FIG. 8.

FIG. 8 allows for a number of applications and manipulations, and principally via the master sensory palate 42. The master sensory palate is a product of technological software that is capable of accommodating the probability density function of one or more two-dimensional drawings placed within it. Each probability density function within the master sensory palate is being shown in the context of its own individual sensory palate. The sensory palate is comprised of thousands of individual pixels or sensors within the framework of an intricate grid, and these sensors facilitate the calculation of a density measure for any two-dimensional drawing super-imposed on the sensory palate. Specifically, sensors within a given sensory palate are either on or off, and are defined as being on when a drawing is superimposed on top of them as at 44. While the pixel format described herein presently allows for the greatest degree of accuracy and functionality, the sensory palate can also be created within a vector format context or with elements of both pixel and vector formats.

There is a separate sensory palate for each distribution that is shown within the master sensory palate. Conceptually, each palate may be thought of as comprising its own interactive transparency such that any distribution shown on one palate does not obscure the views or calculations of any other distribution shown within the master palate. The master palate can accommodate an unlimited number of individual palates.

When a user chooses to change the dimensions of any particular distribution within the master sensory palate, he selects the relevant distribution by left clicking on it. This clicking action highlights the distribution to let the user know that the particular distribution is ready to be modified. The follow-on effects of any change in a distribution depend upon the distribution that is being changed. For example, if an aggregated distribution is changed, then the change is allocated to all segments of the aggregated distribution in such a way as to preserve respective weights, aspect ratios, and inter-marginal probability distributions. When a particular segment of an aggregate distribution is changed, the aggregate distribution is changed, though other segments of the aggregate distribution may or may not be changed. That is, if the relevant segment is being changed in shape only, then the only follow-on effect will be a change in the shape of the aggregate distribution. However, if the relevant segment is changed in terms of its weighting in the aggregate distribution, then the aggregate distribution is changed along with other segments comprising the aggregate distribution. In sum, the individual probabilistic distributions in the master palate comprise an aggregate distribution and each of the aggregate distribution's components, and any changes made to any one of these individual probabilistic distributions are immediately communicated to all other affected distributions. Any time that distributions in the master palate are altered, it is to be expected that the composition of the relevant target portfolio will be altered accordingly, and the user is capable of viewing specific securities within the target portfolio on a real time basis.

In the instance where an aggregate distribution and its attendant components are an amalgamation of multiple investor Risk Return Profiles, the invention readily allows for a scenario whereby the $n^{th}$ investor among multiple investors might want to see how the aggregate distribution is changed when a particular segment within his own Risk Return Profile is altered. For example, he may want to change his market profile to become a more aggressive one. By clicking on the market profile descriptor at 66 in FIG. 8, a detailed listing appears showing individual investor preferences that were previously specified, and allows for those preferences to be modified.

These user or front-end perspectives related to changes in distributions comprise one of several aspects of an internal change algorithm. Once a desired change is made within the master sensory palate and the calculate key 64 is selected in FIG. 8, the pictorial change is mapped to a database where the new distribution is recorded.

At 46 in FIG. 8, changes may be hand-drawn directly within the master sensory palate with the use of a simple drawing tool, imported from a library of existing drawings, or created from mathematical or statistical formulae or functions or any other method of describing a particular shape. A collating function continuously records sensors that are on, reads the total number of drawings that are within the master sensory palate at any point in time, and formulaically transcribes all drawings to a real time repository. Any drawing shown within the master sensory palate is easily saved to a library of profiles by invoking save this page at 50.

Sensory palates show aggregate distributions as well as component distributions all at the same time, and with each profile shown in its proper proportion relative to every other profile. Profiles are shown in the same coloration assigned via the Investor Aggregation Function at FIG. 6. Further, a user can affect profiles within the sensory palate in ways other than via direct manipulation of the distribution's drawing as at 48 in FIG. 8 with the consideration of derivatives. In this instance the user is provided with a choice of derivative products and strategies which when selected are immediately carried over to relevant probabilistic distributions within the master sensory palate. If at any time a user attempts to affect a particular distribution in a way that is inconsistent with any indicated constraints, a message will appear informing the user of this.

Another feature of the master sensory palate is that any distribution or segmentation of a distribution shown within the master sensory palate in FIG. 8 as with 52 can be dragged into a holding block at 54. Any time any particular profile is introduced, redrawn, substituted, or placed into a holding block, a new picture is automatically generated within the master sensory palate to reflect those changes. For example, if the structure segment of an aggregate distribution is placed into a holding block, the shape of the aggregate distribution remains unchanged; the aggregate distribution continues to embody a structure profile within it even if the structure profile is not explicitly highlighted within the sensory palate. Placing a segment of an aggregate distribution into a holding block is not equivalent to rendering the segment void of any relevance (recall the requirement that the sum of a Risk Return Profile's component parts must sum to one-hundred percent). Rather, the act of placing a structure profile into a holding block is a way for the user to express the view that structure risk and return is of a more passive interest to the user relative to having more of a focus on credit and market considerations. Since the overall color of an aggregate distribution is determined by the colors of its respective segments, it might be the case that moving a red-colored structure segment to a holding block has the effect of turning a yellow-colored aggregate profile into a green-colored aggregate profile. There is thus a two-way flow of information between the master sensory palate and relevant database. The database populates the sensory palate with initial conditions pertaining to a set of probabilistic distributions derived from the input process, and any manipulations to that initial set of probabilistic distributions within the master sensory palate are fed back to the database.

The user may at any time request to see the particular financial products underling any of the profiles shown in the master sensory palate by selecting show portfolio holdings 56. The various diagrams shown in FIG. 8 could also be shown in multiple dimensions.

The present invention also allows the user to request that distributions within the master sensory palate be presented in the context of regulatory or other guidelines 58. For example, insurance companies, banks, credit unions, and others are typically limited by the types of securities they may hold or strategies they may pursue, as well as by the overall exposure they may have to the market at any point in time. Upon clicking button 58 the user may specify relevant guidelines and then observe how distributions within the master sensory palate change accordingly. For example, a bank's portfolio distribution that previously appeared as green may turn to yellow when evaluated against Comptroller of the Currency rules and regulations. Other checks and balances can be introduced as an overlay to a portfolio as with the application of a diversity score to help ensure a desired degree of product or strategy diversification within a portfolio.

Continuing with FIG. 8, invoking the simulation mode at 60 allows the user to perform a variety of what-if scenarios as well as extrapolate expected risk and return into various points in the future. When these forward-looking analyses are to be performed, the user may invoke any number of different tools to be used as an integral part of the calculations. For example, the rating agencies make available extensive data pertaining to the historical experience of corporate defaults, and such data could be useful with defining parameters on the likelihood of certain credit events. These exercises, as well as evaluating actual historical best and worst risk and return combinations, can aid the user with determining if their actual or target portfolios are appropriate. If a user also wanted to consider other portfolios that satisfied parameters of the profiles shown in the sensory palate, this can be invoked in FIG. 8 via create portfolios with characteristics shown in master sensory palate 62. Clicking this button invokes the Portfolio Optimization Function that generates a series of portfolios, each with differing sets of investments that match or improve upon the distribution boundaries defined within the master sensory palate. When this option is selected the user is given the opportunity to indicate the latitude of products and strategies that may be used in the portfolio creation process. For example, the user may allow the use of products not originally specified in FIGS. 3-5, or may permit a new strategy-type as with short selling. An option available for professional portfolio managers is the ability to indicate a maximum acceptable tracking error between the target portfolio and the actual portfolio.

In a preferred embodiment, particular sounds could be generated when specific results are achieved as with the creation of an actual portfolio that is in line with a desired target. The present invention also allows for the user to hear specific text being spoken when particular functions or help keys are selected.

Figure 9:
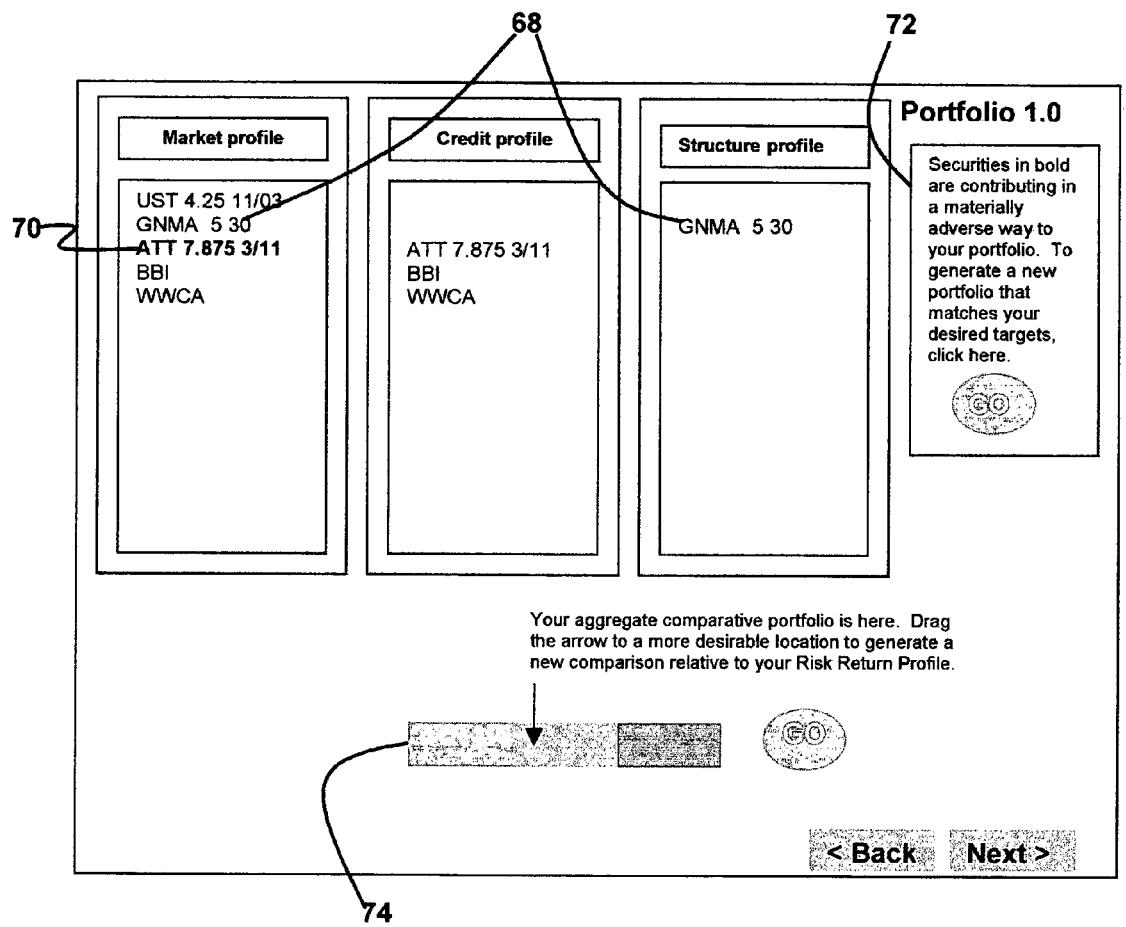
FIG. 9 shows an illustrative display depicting the details of a target portfolio relative to a comparative portfolio according to the method and apparatus of the present invention.

An improved portfolio is defined as one that generates the same or an improved expected return at lower cost, a lower tax rate, a more favorable summary statistic (as with a lower variance), or any other definition of interest. As is well known to those in the field, financial products and services can vary appreciably in price, and different investment strategies can result in materially different tax exposures. FIG. 9 shows how the profile of a proposed improved portfolio might appear. Observe how the same index or security might appear in more than one category of risk in FIG. 9 at 68. This duplication effect is explained by the fact that one financial instrument can embody multiple risk and return characteristics. Observe also in FIG. 9 that certain financial instruments are highlighted in a bold font, though other highlighting techniques could also be applied. This feature is also available when the user requests to see specific securities underling distributions with show portfolio holdings 56 in FIG. 8. Securities appearing in bold under the heading of market, credit, and structure, respectively, as at 70, in FIG. 9 are intended to instruct the user that the highlighted security is contributing in a material way to preventing a particular distribution from being coded green. For example, the removal of all instruments flagged under the credit heading could significantly and positively affect the credit risk and return segment of a distribution. If a user chose to have a set of industry or proprietary guidelines superimposed on a portfolio, then securities appearing with an asterisk or any other designation of interest could flag those instruments contributing to a violation of the guidelines.

As is shown in FIG. 9, and as is also a feature provided when a user selects show portfolio holdings 56 in FIG. 8, the user is presented with the opportunity to invoke the Portfolio Optimization Function at 72 in FIG. 9 to take an existing non-green portfolio and have it brought to a color-code that is closer to green or fully green. By invoking this option at 72 in FIG. 9, any flagged securities are typically removed, and new securities may be added. The user is able to signal how much closer they want to be to green by clicking on the appropriate color as shown at 74 in FIG. 9. When a new proposed portfolio is generated, previously existing securities recommended for keeping are shown in black, previously existing securities recommended for sale are shown in red, and new securities recommended for inclusion are shown in green. Comparable results are easily achieved with a non-color approach by highlighting securities with varied fonts or symbols. Further, if multiple portfolios are created, the user may specify how these are to be sorted as with consideration of fees, pre- or after-tax returns, years of a given fund's existence, a particular summary statistic or financial variable or filter, or any particular sort criterion of interest.

Figure 10:
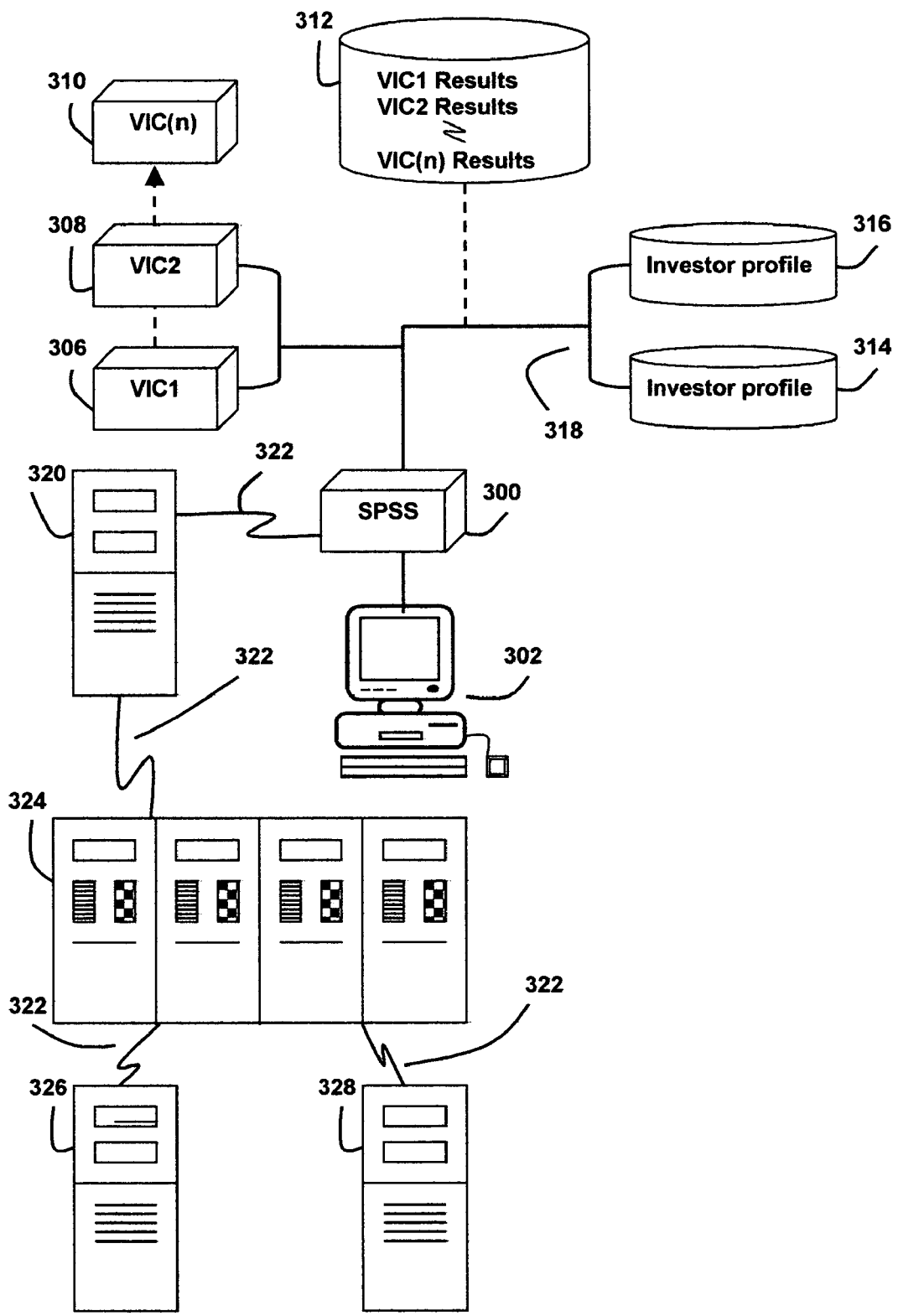
FIG. 10 is a schematic drawing of a system configuration of the present invention.

Now referring to FIG. 10, a schematic block diagram of the sensory-palate support system SPSS of the present invention is shown. As can be seen, sensory palate support system. SPSS 300, in a preferred embodiment, is a computer program stored in a computer that is also connected to a display terminal 302, an investor profile database 318, a series of virtual investment counselors 306, 308, 310, and a virtual investment counselor database 312. Similarly, in a preferred embodiment, the computer in which sensory palate support system SPSS 300 is executing is also in communication with another computer 320, over communications network 322. As will be apparent to those skilled in the art, sensory palate support system SPSS 300 could communicate with display terminal 302 over the Internet.

In a preferred embodiment remote computer 320 in FIG. 10 might be located at the site of a brokerage firm authorized to accept and execute securities transactions for the users of the present invention. As can be seen, computer 320 in FIG. 10 might be located at a brokerage and in communications with various computers 324, 326, and 328 that could facilitate the electronic trading of any securities. As will be apparent to those skilled in the art, there are a number of ways that trades can be transmitted electronically for execution in a securities or commodities or other exchange.

Figure 11:
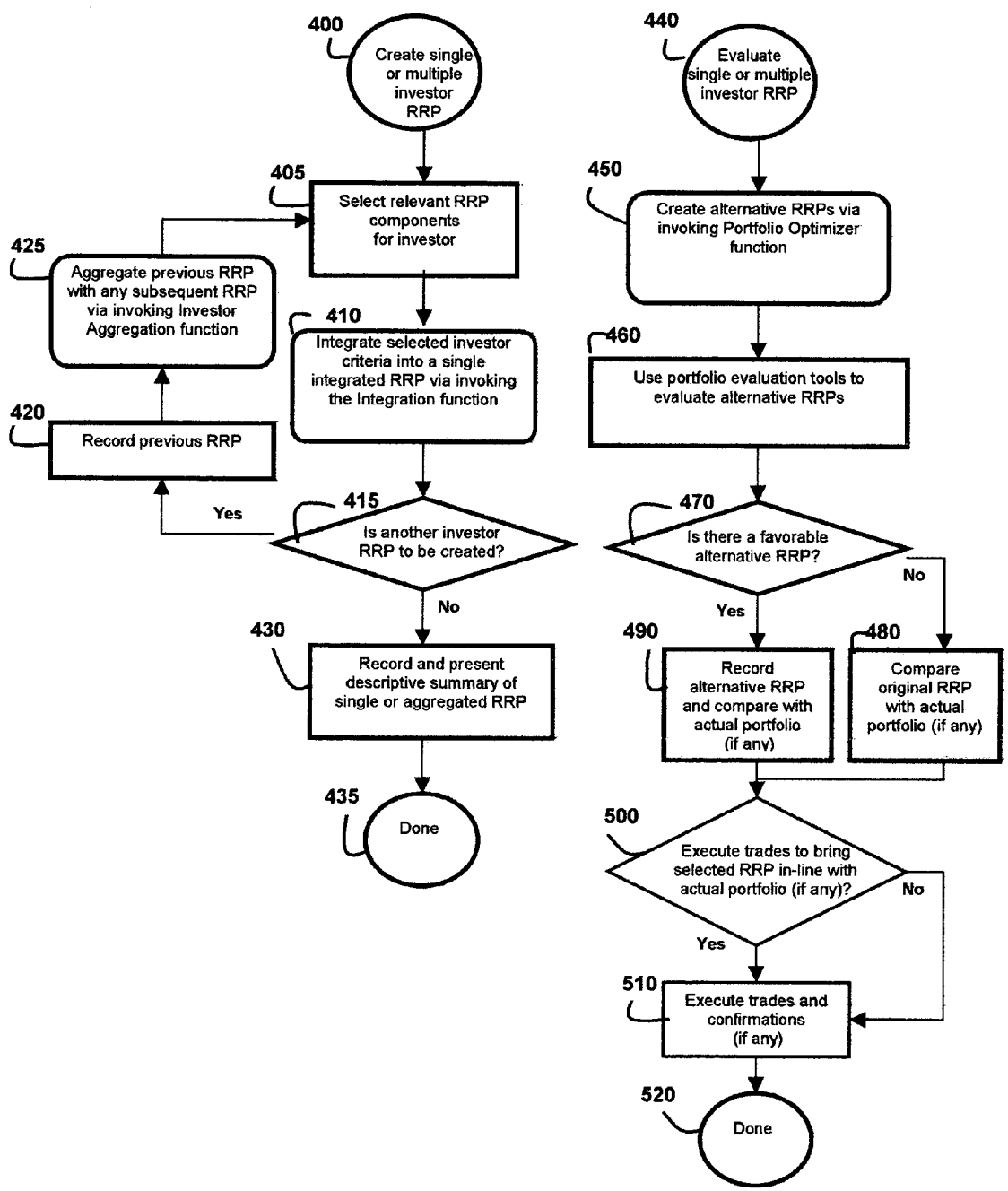
FIG. 11 is a schematic drawing of a system implementation of the present invention over a network.

The process of creating a Risk Return Profile for a single or multiple investors is described in FIG. 11, as is the process of evaluating a single or multiple investor Risk Return Profile. As shown in FIG. 11, the creation of a single or aggregated Risk Return Profile at 400 involves selection of the relevant Risk Return Profile components for the investor at 405. These components, collectively comprising the Risk Return Profile, may consist of market risk and return, credit risk and return, and structure risk and return. In the rather extreme instance of an investor's desired Risk Return Profile being one hundred percent comprised of Treasury bills, credit risk and return and structure risk and return would not be relevant considerations. Accordingly, this investor's Risk Return Profile would be one hundred percent market risk and return. Equation 1 defines how the components of a single investor's Risk Return Profile are aggregated together as at 410 in FIG. 11.

$$P_{x_1, \ldots, x_k}(t_1, \ldots, t_k) = \Sigma_{(x_1, \ldots, x_k)} f(x_1, \ldots, x_k)(x_1, \ldots, x_k) t_1^{x_1} \ldots t_k^{x_k}. \quad \text{EQU2}$$

Weightings for EQU2 are determined by the contributions of respective Risk Return Profile components, and such that these individual weights are constrained to sum to one hundred percent.

If there is an extreme case where a single investor's Risk Return Profile is comprised exclusively of market risk and return, then EQU2 is appreciably simplified. However, in the presence of multiple risk and return segments, perhaps even exceeding the three proposed categories of market, credit, and structure, then EQU2 easily accommodates this.

In the event that multiple investor Risk Return Profiles are to be generated and combined into an aggregated Risk Return Profile as at 415 in FIG. 11, then previous single investor Risk Return Profiles are successively recorded at 420 and combined with all other relevant Risk Return Profiles at 425. This process of aggregating multiple Risk Return Profiles is also achieved with EQU2, whereby the relative importance of respective investors' Risk Return Profiles are appropriately weighted and such that individual weights are constrained to sum to one-hundred percent.

Once either a single or multiple investor Risk Return Profile is created, it may then be evaluated in a variety of contexts. For example, as at 450 in FIG. 11 the user may signal the desire to review other portfolios that match or improve upon a particular Risk Return Profile. An improvement may be defined as a Risk Return Profile that is capable of generating an equivalent or superior expected return at the same or lower level of variance, or for a more positive profile of skew or leptokurtosis. In a preferred embodiment of this feature, an algorithm is used in the vein of a linear programming function whereby the user identifies a particular objective function and any constraints.

The probability generating function of a particular segment within an aggregate probability distribution (as with a Risk Return Profile), also called a marginal probability distribution, is defined for marginal distribution $F_{x_j}$ as $$P_{x_j}(t_j) = P_{x_1, \ldots, x_j, \ldots, x_k}(1, \ldots, 1, t_j, 1, \ldots, 1). \qquad \text{EQU3}$$

In the instance where an investor may want to isolate and hedge the credit segment (marginal probability distribution) of a particular Risk Return Profile, this could be accomplished with a derivatives overlay. For example, to temporarily limit a given Risk Return Profile's exposure to credit, a credit default swap might be used. In this instance there is the possibility that the Risk Return Profile's shape could change per the swap's contribution, as well as the possibility that a change in coloration could materialize for both the credit component of the Risk Return Profile and, in turn, the aggregate Risk Return Profile. When a hedge strategy is employed, changes can be expected in the shape and coloration of the marginal probability distributions of the Risk Return Profile and, hence, the shape and coloration of the aggregate Risk Return Profile. In the context of a credit hedge, the contribution of the credit marginal probability distribution will shrink in relation to the size and nature of the hedge that is used. This shrinkage is explained by the hedge's affect on reducing credit's contribution to the Risk Return Profile. As a direct result of credit's lower profile within the Risk Return Profile, remaining marginal probability distributions (such as market and structure exposures) take on a higher profile; the sum of probabilities within the master sensory palate must combine to total one hundred percent. When the contribution of one marginal probability distribution is reduced, unless otherwise specified by the user, the remaining marginal probability distributions will have their contributions increased, and in such a way as to preserve respective aspect ratios and inter-marginal probability distribution relationships.

As shown at 470 in FIG. 11, if at any point a new reference portfolio is thought be desirable, this new profile may be recorded as at 490. If no new desirable profile is identified, the user simply reverts to the previous Risk Return Profile. In the event that there is a pre-existing portfolio, a comparison of security holdings may be made between the relevant Risk Return Profile and the actual portfolio as shown at 490 in FIG. 11, and if the user chooses, he may signal the desire to generate market trades at 500 that will bring the Risk Return Profile and actual portfolio in-line with one another. If trades are executed, appropriate confirmations are generated as per 510 in FIG. 11.

Figure 12:
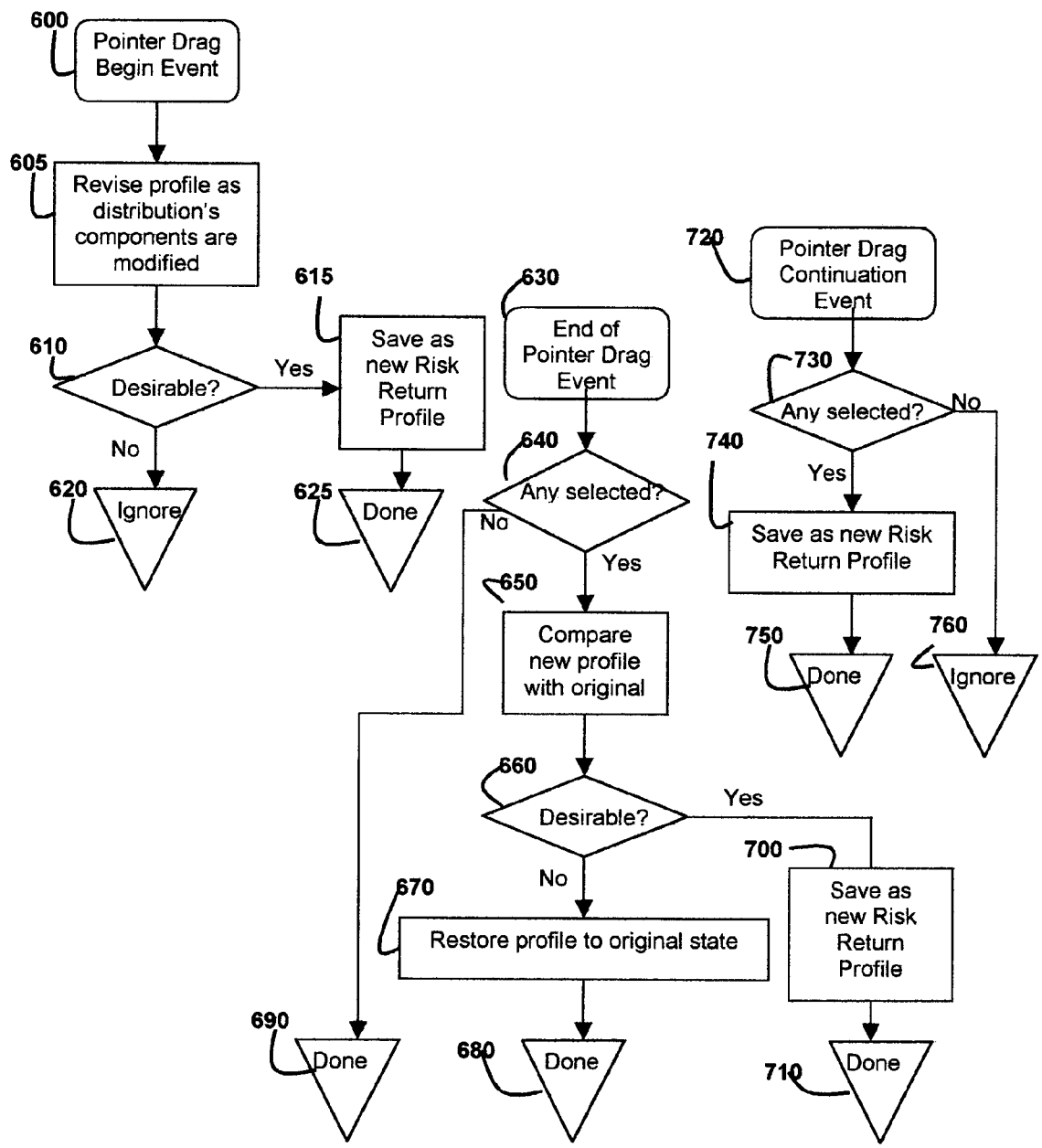
FIG. 12 is a flow diagram of the system logic for the risk return profile control of the present invention.

An additional perspective of evaluating a Risk Return Profile or component of a Risk Return Profile is provided in FIG. 12. As at 605 in FIG. 12, the user may click on the probabilistic distribution of interest and drag the distribution into a new desired shape. If the Risk Return Profile itself is changed then changes are processed in such a way as to preserve respective weights, aspect ratios, and inter-marginal probability distributions of the Risk Return Profile, and new drawings are generated accordingly. If a component of a Risk Return Profile is selected as with its structure segment, then changes are processed in such a way as to preserve respective weights, aspect ratios, and inter-marginal probability distributions of the Risk Return Profile, and new drawings are generated accordingly. In the event that a user desires to change both the shape and weighting of a Risk Return Profile component, or to change either of these for more than one Risk Return Profile component, these are accommodated in a preferred embodiment of the algorithm. In the event that any particular changes are ultimately deemed as desirable, then a new Risk Return Profile is saved at 615 in FIG. 12, and if any comparison is desired between a new and previous Risk Return Profile this may be requested as at 650 where the user is also provided the opportunity to reject the new Risk Return Profile in favor of the previous at 670.

The present invention may also be of value with other financial applications that involve probability distributions. For example, financial analysts are typically called upon to offer expert expectations on the future behavior of an equity's price or earnings. These expectations can be readily translated into a probability distribution. However, a key element pertains to the aggregation process when multiple analyst distributions are involved. The matter of combining expert opinions is a relatively recent topic in the field of econometrics and statistical design.

All else being equal, independent expert opinions are of greater value than inter-dependent expert opinions, and converging opinions are of greater value than diverging opinions. To quantify the degree of analyst independence/inter-dependence, a simple scoring process can be applied. For example, basic data could be required of research analysts pertaining to various categories inclusive of, though not limited to, education, professional orientation, experience, and research bias. Once required input is provided, an integration function could be invoked to score the overall independence/inter-dependence of analysts' expectations on a scale from zero to three; zero connoting a high degree of inter-dependence among analysts, and three connoting a high degree of independence among analysts. Another point scale of interest could also be supported by the present invention. Once generated, independence/inter-dependence scores could then be mapped to a corresponding statistical measure of correlation, rho. For present purposes rho would range in value between zero and one, with zero representing perfect independence, and one representing extreme inter-dependence. Another point scale of interest could also be supported by the present invention. The pairings shown below present a preferred embodiment of the relationship between independence/interdependence scores and values of rho, though other mappings could certainly be applied.

| Independence/<br>Inter-dependence<br>Score | Rho (ρs) |
| --- | --- |
| 0.00-0.50 | 1.0 |
| 0.51-1.00 | 0.8 |
| 1.01-1.50 | 0.6 |
| 1.51-2.00 | 0.4 |
| 2.01-2.50 | 0.2 |
| 2.51-3.00 | 0.0 |

The next required set of data would be profiles of individual analyst's expected price and probability scenarios. These profiles would be combined into a single aggregate profile as per EQU2, and under the initial assumption that these individual analyst profiles were perfectly independent. The value for variance in EQU2 would then be modified upon applying the results of the independence/inter-dependence scoring methodology.

The modification of variance in EQU2, if any is required, is described by EQU4, and is as follows:

$$\rho_s (\text{Var}[X_i])^{0.5} (\text{Var}[X_j])^{0.5}, \qquad \text{EQU4}$$

where the value of $\rho_s$ is rho as described above.

The result of EQU4 is added to the aggregated value for variance obtained in EQU2, and it is this new value of variance that is used to generate a pictorial of the aggregate analyst profile.

Observe that when $\rho_s$ is zero, defined as perfect independence among analysts, EQU4 becomes zero and the aggregate analyst profile is completely described by EQU2. However, in the event that $\rho_s$ is non-zero, EQU4 has value and the affect of adding this value to the aggregated variance obtained in EQU2 is to spread the aggregate analyst distribution over a wider range of equity values; there is an added level of uncertainty directly attributable to analysts' inter-dependence. The methodology for measuring discrepancies among analyst expectations and mapping these against a color-coded guide could be the same as that described previously for portfolios.

A non-obvious result of the above-described methodology is that more may mean less. That is, in contrast to the viewpoint that multiple expert opinions ought to be preferable to fewer expert opinions, the methodology described herein suggests that this may not always be true in light of important qualitative factors. To with, as reflected in EQU2 and EQU4, the more divergent and inter-dependent number of analyses that are brought to bear, the more the extreme the tails of the resulting aggregate distribution. With wider tails reflecting greater uncertainty, it is the case that more opinions translate into less of an aggregate certainty of an ultimate outcome.

For users who value independent stock research, a database of previously described variables is easily accommodated. The database could be queried on the basis of scores, colorations, distribution characteristics, recommendations to buy, sell, or hold, or any other variables of interest, and either as separate or overlapping inquiries. The database could also be linked with a user's portfolio to provide a realtime monitor of analysts' expecations relative to actual portfolio holdings. An additional link could also be created whereby buy or sell recommendations could automatically communicate a buy or sell order directly to a broker or to a broker via an electronic or personal interface. Other applications of the present invention could include combining expert medical opinions related to the expected outcome of a particular drug or procedure, or dissecting contributory factors (weather, equipment, human, or other) affecting the aggregate variability of differences a carrier's (transporter of people or goods) actual and target arrival times.

I claim:

1. A computer implemented system for aggregating and segmenting probabilistic distributions in real time comprising the steps of:

an input device for creating a target profile from the input of one or more users using stated preferences or expectations relative to data about which probabilistic distributions exist;

a computer program for simulating the future behavior of the target profile or comparative profiles with historical data;

a second computer program for identifying substitute profiles that match or improve upon the target profile or comparative profiles;

a third computer program for modifying a target profile or comparative profiles by selectively adding, eliminating, or changing particular probabilistic distribution characteristics in response to user-defined parameters or movements of an interactive user operated control;

a fourth computer program for codifying any discrepancies between a target profile and comparative profiles;

a fifth computer program for sensing and tracking single or multiple probabilistic distributions;

a sixth computer program for sensing and tracking multiple segments of a single aggregate probabilistic distribution; and a display for generating results in a continual manner so that immediate feedback is displayed to the user as a discrepancy indicator wherein the step of codifying any discrepancies between a target profile and a comparative profile further comprises the step of calculating such discrepancies according to the following formula:

$$\text{Discrepancy} = |E[X_{Target}] - E[X_{Comparative}]| / (Var[X_{Target}])^{0.5}, \quad \text{EQU1}$$

where $E[X_{Target}]$ represents the mean of a target data series, $E[X_{Comparative}]$ represents the mean of a comparative data series, and $Var[X_{Target}]$ represents the variance of a target data series; and where respective values are weighted per user specifications and where the sum of weights is required to total one hundred percent.

2. The system of claim 1, wherein the step of codifying any discrepancies between a target profile and a comparative profile further comprises the step of computing color displays according to the result of EQU1 whereby a value less than or equal to 1.00 is coded green, a value greater than 1.00 but less than or equal to 2.01 is coded yellow, and a value greater than 2.01 is coded red.

3. The system of claim 1, wherein the step of aggregating marginal probability distributions into a single probabilistic distribution, or combining multiple aggregated probabilistic distributions, is defined by the following formula:

$$P_{X_1, x_k^{(x_1, \ldots, x_k)t_1^{y_1} \ldots t_k^{y_k}}}^{(t_1, \ldots, t_k)} = \Sigma_{(x_1, \ldots, x_k)} fx_1, \ldots, \quad \text{EQU2}$$

where $P_X(t)$ is defined as a probability generating function of data series X expressed as $\Sigma fx^{(x)} t^x$ in the multivariate case when X is discrete; and where for a data series $x_1, \ldots, x_k$, the joint probability density function is defined as $fx_1, \ldots, x_k$; and where for any subset of $\{X_1, X_2, \ldots, X_k\}$, the joint probability distribution is defined as a marginal probability distribution of $fx_1, x_2, \ldots, x_k$.

4. The system of claim 1, wherein the step of isolating a segment of an aggregated probabilistic distribution, called a marginal probability distribution, is defined by the following formula:

$$P_{X_j}(t_j) = P_{X_1, \ldots, X_j, \ldots, X_k}^{(1, \ldots, 1, t_j, 1, \ldots, 1)}, \quad \text{EQU3}$$

where $P_{X_j}(t_j)$ is defined as a probability generating function of data series $X_j$ expressed as $\Sigma fx_j^{(x_j)} t_j^{x_j}$ in the univariate case when $X_j$ is discrete.

5. The system of claim 4, further comprising the step of aggregating said expert expectations using EQU1 and if required EQU4 defined as:

$$\rho_s (Var[X_i])^{0.5} (Var[X_j])^{0.5}, \quad \text{EQU4}$$

where $\rho_s$ represents the correlation coefficient between expectations data series $X_i$ and $X_j$, $Var[X_i]$ represents the variance of data series $X_i$, and $Var[X_j]$ represents the variance of data series $X_j$.

6. A computer implemented method and apparatus for aggregating and segmenting probabilistic distributions in real time, comprising the steps of:

creating a target profile from the input of one or more users using stated preferences or expectations relative to data about which probabilistic distributions exist;

simulating the future behavior of the target profile with historical data;

identifying substitute profiles that match or improve upon the target profile;

modifying a target profile by selectively adding, eliminating, or changing particular probabilistic distribution characteristics in response to user-defined parameters or movements of an interactive user operated control; and codifying any discrepancies between a target profile and a comparative profile by calculating such discrepancies according to the following formula:

$$\text{Discrepancy} = |E[X_{Target}] - E[X_{Comparative}]| / (Var[X_{Target}])^{0.5}, \quad \text{EQU1}$$

where $E[X_{Target}]$ represents the mean of a target data series, $E[X_{Comparative}]$ represents the mean of a comparative data series, and $Var[X_{Target}]$ represents the variance of a target data series; and where respective values are weighted per user specifications and where the sum of weights is required to total one hundred percent.

7. The method of claim 6, wherein the step of codifying any discrepancies between a target profile and a comparative profile further comprises the step of computing color displays according to the result of EQU1 whereby a value less than or equal to 1.00 is coded green, a value greater than 1.00 but less than or equal to 2.01 is coded yellow, and a value greater than 2.01 is coded red.

8. The method of claim 6, wherein the step of aggregating marginal probability distributions into a single probabilistic distribution, or combining multiple aggregated probabilistic distributions, is defined by the following formula:

$$P_{X_1,\ldots,X_k}(t_1,\ldots,t_k) = \Sigma_{(x_1,\ldots,x_k)} f x_1,\ldots,x_k(x_1,\ldots,x_k) t_1^{x_1} \ldots t_k^{x_k}, \quad \text{EQU2}$$

where $P_X(t)$ is defined as a probability generating function of data series X expressed as $\Sigma f x^{(x)} t^x$ in the multivariate case when X is discrete; and where for a data series $x_1, \ldots, x_k$, the joint probability density function is defined as $f x_1, \ldots, x_k$; and where for any subset of $\{X_1, X_2, \ldots, X_k\}$, the joint probability distribution is defined as a marginal probability distribution of $f x_1, x_2, \ldots, x_k$.

9. The method of claim 6, wherein the step of isolating a segment of an aggregated probabilistic distribution, called a marginal probability distribution, is defined by the following formula:

$$P_{X_j}(t_j) = P_{X_1,\ldots,X_j,\ldots,X_k}(1,\ldots,1,t_j,1,\ldots,1), \quad \text{EQU3}$$

where $P_{X_j}(t_j)$ is defined as a probability generating function of data series $X_j$ expressed as $\Sigma f x_j^{(x_j)} t_j^{x_j}$ in the univariate case when $X_j$ is discrete.

10. The method of claim 6, further comprising the step of aggregating said expert expectations using EQU1 and if required EQU4 defined as:

$$\rho_s (Var[X_i])^{0.5} (Var[X_j])^{0.5}, \quad \text{EQU4}$$

where $\rho_s$ represents the correlation coefficient between expectations data series $X_i$ and $X_j$, $Var[X_i]$ represents the variance of data series $X_i$, and $Var[X_j]$ represents the variance of data series $X_j$.

* * * * *